Figure 1:
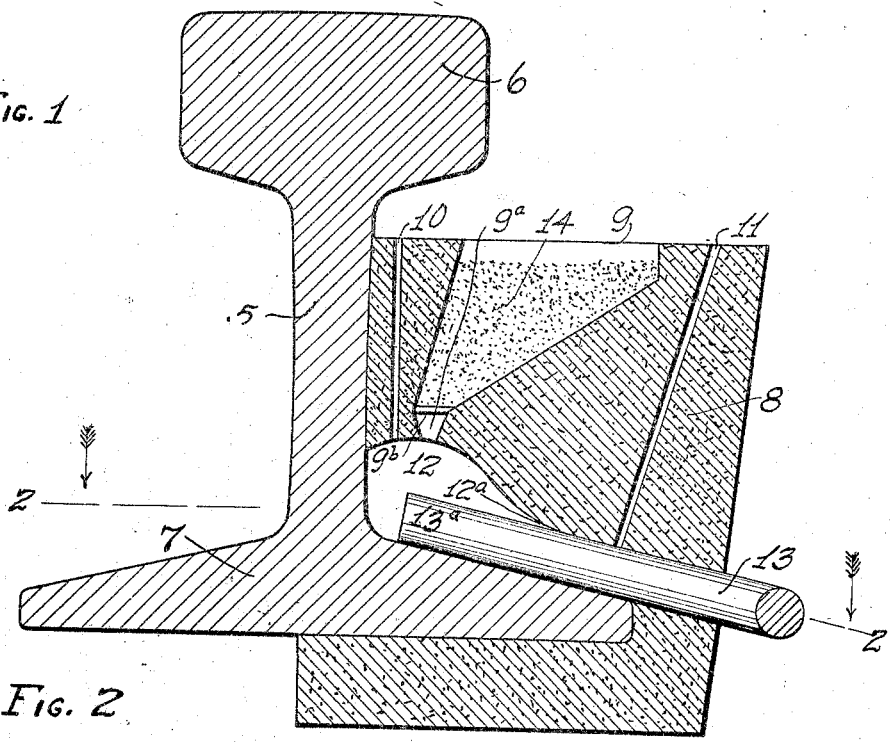

No. 878,868.  PATENTED FEB. 11, 1908.
W. H. COLE.
PROCESS FOR UNITING METALS.
APPLICATION FILED MAY 6, 1905.

3 SHEETS—SHEET 1.

Witnesses
Henry R. Bauer.
J. C. Conradi.

William Howard Cole
Inventor
By Starr Cruser Scherr
his Attorneys

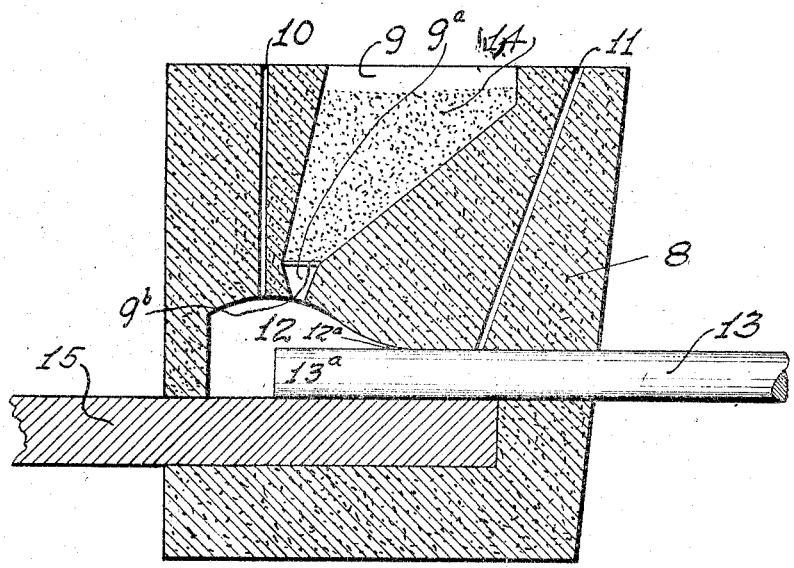

UNITED STATES PATENT OFFICE.

WILLIAM HOWARD COLE, OF NEW YORK, N. Y., ASSIGNOR TO ELOC COMPANY, OF NEW YORK, N. Y.

PROCESS FOR UNITING METALS.

No. 878,868.  Specification of Letters Patent.  Patented Feb. 11, 1908.

Continuation of application Serial No. 235,707, filed December 6, 1904. This application filed May 6, 1905. Serial No. 259,100.

*To all whom it may concern:*

Be it known that I, WILLIAM HOWARD COLE, a citizen of the United States, and a resident of the borough of Brooklyn, city and State of New York, have invented a new and Improved Process for Uniting Metals, of which the following is a full, clear, and exact description.

My invention relates to a process for uniting metals, and more particularly to a process for uniting metals of different melting points, and is a continuation of a prior application filed by me Dec. 6, 1904, Se. No. 235,707.

In the accompanying drawings I have illustrated one form of apparatus which may be used for carrying out my improved process, but I do not wish to limit this application either to this or any form or type of apparatus, as my process may be carried out in any suitable way, and by the use of any suitable apparatus selected by the user.

By the use of my improved process it is possible to take two metals and weld them together to form at the junction thereof what may be called a homogeneous joint. For example, if it is desired to join copper and steel, it may be accomplished by the use of my process by melting each of the metals to be joined throughout a portion or the whole of their line or plane of contact, and allowing them to mingle to a greater or less extent to form an alloy or other homogeneous mass which when cooled leaves the copper and the steel thoroughly welded together. In the preferred method of carrying out my process, I succeed not only in accomplishing the above result, but also in leaving both of the metal pieces to be joined, as, for example, the piece of copper and the piece of steel, substantially unchanged in form, or, in other words, having substantially the same shape or configuration as they originally possessed before the welding operation began—at least throughout a portion of the line or plane of junction. In some cases, therefore, upon the completion of my process I secure a resulting or final construction which, first, is substantially integral throughout, and, second, comprises a piece of copper which throughout a portion of its junction plane is substantially unimpaired and unchanged as to either form or composition from its original condition, and which also is integral with both an alloy and the piece of steel, which steel is in turn throughout a portion of its junction plane substantially unimpaired, and which is also integral with the intervening alloy throughout the remainder of its junction plane.

I will now describe the form of apparatus shown in the accompanying drawings, and also explain how my process may be carried out by the use of the same.

In these drawings similar reference letters designate corresponding parts.

Figure 2:
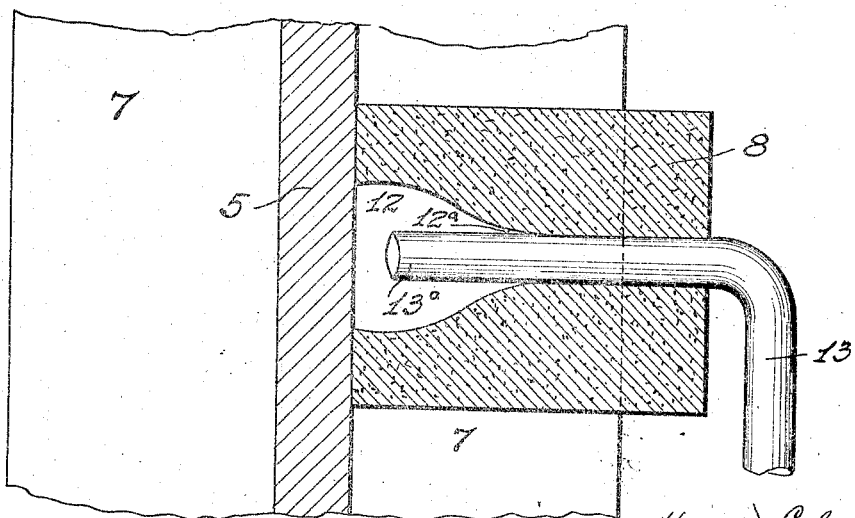
Figure 3:
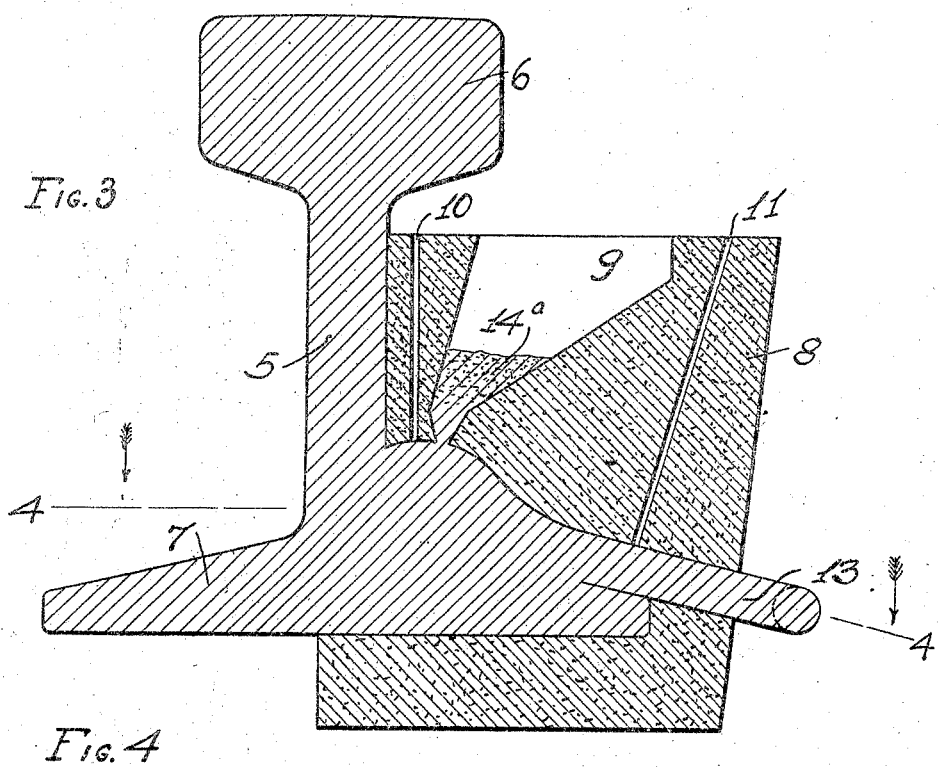
Figure 4:
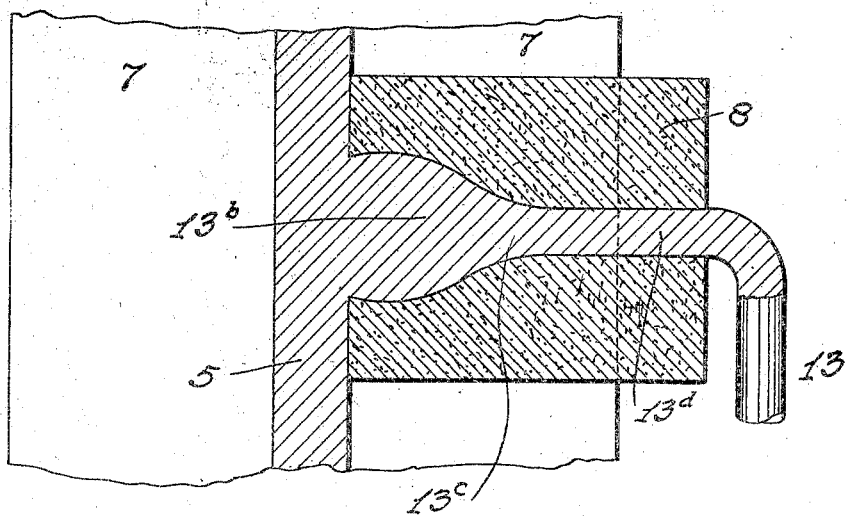

Figure 1 illustrates in vertical cross-section an apparatus of one form which may be used in carrying out my invention for the purpose of welding a copper bond to one flange of a rail section; Fig. 2 is a horizontal cross-section taken on the line 2—2 of Fig. 1, showing some parts in plan. Fig. 3 is the same view as Fig. 1, showing approximately one form of result which will be produced after my process is completed and before the removal of the apparatus used therewith; Fig. 4 is the same view as Fig. 2, illustrating the same conditions illustrated in Fig. 3; Fig. 5 shows the same general type of apparatus applied for the joining of a metal plate and a metal rod.

Referring, now, to these drawings (Figs. 1 to 4), 5 designates the web of a rail, 6 the top or tread of the same, and 7 the flanges thereof.

13 designates what may be called a bond which, of course, may be of any form, but which is shown as in the form of a rod. As shown (Fig. 1) this metal rod 13 has its inner end 13$^a$ resting upon and in direct contact with the upper surface of one of the flanges 7.

8 designates a mold having a mold chamber 12. As shown, this mold chamber is provided with a tapering or conical portion 12$^a$, the purpose of which will hereinafter be explained.

I do not wish in this application to limit myself in any way to the use of a mold, and particularly to the use of any form of mold or any shape of mold chamber, as the purpose above referred to may be carried out in any other suitable manner and still embody my invention.

Wherever a mold is used in carrying out my invention, it is my purpose to introduce into the mold chamber thereof, and in any suitable way, what I may call a fusing agent which will be adapted temporarily to raise each of the metals to be joined to a temperature at least coincident with and preferably a trifle above their respective melting points.

In the particular form of apparatus shown in the accompanying drawings, I accomplish this result by providing what I may call a crucible, or crucible chamber 9, which is, as shown, arranged in the upper portion of the mold 8, and which is connected with the mold chamber 12 by a suitable passage. This passage, or connecting orifice, may be closed in any suitable manner, as, for example, by a plug or plate designated $9^b$, which may be of metal or other suitable material. The fusing agent may, broadly speaking, be of any suitable nature, having the capability when it enters the mold chamber of raising the respective metals to be joined to the respective temperatures above indicated. For example, I may use a mixture of metal containing oxygen, and aluminium, such, for example, as iron oxid and aluminium. If these are ignited in the crucible, or crucible chamber, a violent reaction will result, producing, first, a molten metal, and, second, an alumina slag. Naturally the lighter slag will rapidly rise to the top, and at least a portion of the gases escape upwards from the open upper end of the crucible, whereas the heavier molten metal will sink to the bottom of the crucible chamber. As the heat of this molten reactionary metal is extremely great, it may burn out or tap the intervening plug $9^b$, and, as it were, automatically discharge itself into the mold chamber. If not, this tapping of the plug can readily be accomplished by hand.

Obviously, if the rod 13 is of comparatively low melting point, or of some material such as copper, and the metal piece to which it is to be joined is of a considerably higher melting point, such as a steel rail, the sudden and even distributing of the molten fusing agent upon the two different metals would result either in a failure to fuse the steel or in the destruction, or burning up, or absolute disintegration of the copper. Consequently, it is important under conditions such as above stated, or wherever there is any appreciable difference in the melting points of the two metals, and wherever a mold is used, to devise some means of regulating the total number of heat units which are brought to bear respectively upon the two different metals in such a way as, first, to raise the temperature of each metal at least to substantially its melting point, and, second, to prevent raising the temperature of the metal (such as the copper rod) having the lower melting point to such an extent as appreciably to destroy the latter, at least throughout a part of the plane or line of junction between it and the other metal piece. When I use the general type of apparatus illustrated in the accompanying drawings, I prefer to accomplish this last mentioned and most desirable result in the manner shown in these drawings where I have illustrated the mold chamber as being provided with a tapering portion $12^a$ gradually decreasing in area down to the point where the copper strip is inserted. At or near the outer end of this tapering portion $12^a$ I have provided a vent 11, which may be extended in any desired direction to the atmosphere to permit of the escape of any undesirable gases which may remain in the molten fusing agent, or which may be created by the same and its action upon the metals to be treated. Preferably this vent will extend in an upward direction, as the gases will naturally have a tendency to rise. As the fusing agent runs into the mold chamber in such a construction as above described, the greatest number of heat units thereof will evidently be brought to bear upon and taken up by the metal in the main portion of the mold chamber, or in that portion thereof having the greatest area. For example, in the illustrations the greatest proportion of the heat of the agent will be applied to and exhausted on the lower portion of the web and the inner portion of the flange of the steel rail and the inner end of the copper bond. So soon as the tapering portion $12^a$ of the mold chamber is reached by the agent the number of active heat units will begin to decrease, and will continue decreasing down to the end of this portion. Of course the extent of the taper of this portion of the mold chamber, and also its proportions relative to the main portion of the mold chamber, will vary under different conditions and will depend, first, on the nature of the agent and its fusing capacity; second, the respective melting points of the metals to be joined; and, third, the approximate effect which it is desired to produce upon the metal having the lower melting point.

Preferably the entire areas of the mold chamber and the crucible in a construction such as illustrated in the drawings will be regulated relatively to each other so that when the reactionary metal flows into the mold chamber it will fill the same, thus avoiding the entrance of any of the alumina slag. This regulation is necessary, however, only when some agent is used where it is desirable to introduce one part only thereof into the mold chamber.

In Fig. 5 I have shown a modified arrangement from that shown in the other figures, for the purpose of adapting the mold to join a copper rod 13 to a steel plate 15 instead of to a rail, as in the other figures.

What I claim as new is:

1. The process of welding two metals of different melting points, which consists in placing the two metals in the positions in which they are desired to be welded; surrounding the same with a fusing agent adapted to fuse both metals and so controlling the action of the heat units of the fusing agent on the two metals that a portion of the metal of lower melting point will be converted into an alloy with a portion of the metal having the higher melting point and prevent any material distribution of the remaining portion of the metal having the lower melting point.

2. The process of welding two metals of different melting points, that consists in placing the two metals in the positions in which they are desired to be welded, surrounding portions of both metals with a fusing agent in sufficient quantity to fuse both metals, and other portions thereof with a quantity less than sufficient to fuse the metal having the lower melting point.

In testimony whereof, I have signed my name to this specification in the presence of two subscribing witnesses.

WILLIAM HOWARD COLE.

Witnesses:
 F. T. STEWART,
 HENRY R. BAUER.